(12) United States Patent
Chasen et al.

(10) Patent No.: US 10,501,198 B2
(45) Date of Patent: Dec. 10, 2019

(54) FUEL SYSTEM BREAKAWAY VALVE REACTION BRIDGE AND REACTION COLLAR

(71) Applicant: Sikorsky Aircraft Corporation, Stratford, CT (US)

(72) Inventors: Scott A. Chasen, Orange, CT (US); Robert R. Rogstad, Woodstock, CT (US); Chris John Biehl, Hamden, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 494 days.

(21) Appl. No.: 15/310,032

(22) PCT Filed: May 6, 2015

(86) PCT No.: PCT/US2015/029398
§ 371 (c)(1),
(2) Date: Nov. 9, 2016

(87) PCT Pub. No.: WO2015/171716
PCT Pub. Date: Nov. 12, 2015

(65) Prior Publication Data
US 2017/0259932 A1    Sep. 14, 2017

Related U.S. Application Data

(60) Provisional application No. 61/990,747, filed on May 9, 2014.

(51) Int. Cl.
*B64D 37/04* (2006.01)
*B64D 37/02* (2006.01)
(Continued)

(52) U.S. Cl.
CPC .......... *B64D 37/12* (2013.01); *B64D 37/005* (2013.01); *B64D 37/04* (2013.01); *B64D 37/14* (2013.01); *F16K 17/40* (2013.01)

(58) Field of Classification Search
CPC .......... B60K 15/073; B60K 2015/0675; B64D 37/02; B64D 37/04; B64D 37/005; F16K 17/40
See application file for complete search history.

(56) References Cited

U.S. PATENT DOCUMENTS

| | | | | |
|---|---|---|---|---|
| 3,026,070 A | * | 3/1962 | Reynolds | B64D 37/005 137/68.14 |
| 4,258,738 A | * | 3/1981 | Redman | B64D 37/005 137/68.14 |

(Continued)

FOREIGN PATENT DOCUMENTS

WO    9828059 A1    7/1998

OTHER PUBLICATIONS

Alpha Process Controls, "Fluid Transfer Safety Solutions", downloaded from http://www.alphaprocess.co.uk/ on Nov. 25, 2013.

(Continued)

*Primary Examiner* — Philip J Bonzell
*Assistant Examiner* — Tye William Abell
(74) *Attorney, Agent, or Firm* — Cantor Colburn LLP

(57) ABSTRACT

A flexible fuel bladder assembly for an aircraft includes a flexible fuel bladder positioned at an airframe and having an opening to allow a flow of fuel into and/or out of the fuel bladder. A breakaway valve is operably connected to the fuel bladder at the opening to control a flow of fuel therethrough. A non-contacting or loose fitting reaction feature is affixed to the airframe and is interactive with the breakaway valve such that movement of the breakaway valve relative to the reaction feature results in breakage of a valve body of the (Continued)

breakaway valve and closure of the breakaway valve to prevent flow of fuel therethrough while also allowing for a second reaction mode to cause breakage of a valve body should the connecting hose be pulled relative to the breakaway valve.

13 Claims, 7 Drawing Sheets

(51) Int. Cl.
*B64D 37/12* (2006.01)
*F16K 17/40* (2006.01)
*B64D 37/00* (2006.01)
*B64D 37/14* (2006.01)

(56) References Cited

U.S. PATENT DOCUMENTS

| | | | | |
|---|---|---|---|---|
| 4,307,744 A | * | 12/1981 | Marrison | F16K 17/40 137/572 |
| 4,323,094 A | * | 4/1982 | Paulis | B64D 37/16 137/614.03 |
| 4,361,165 A | * | 11/1982 | Flory | F16K 17/40 137/614.02 |
| 4,609,004 A | * | 9/1986 | Greene | B64D 37/32 137/322 |
| 5,755,425 A | | 5/1998 | Marolda | |
| 5,776,341 A | * | 7/1998 | Barnard | B01D 29/114 210/306 |
| 5,924,445 A | | 7/1999 | Ambrose et al. | |

OTHER PUBLICATIONS

International Search Report and the Written Opinion of the International Searching Authority for Application No. PCT/US2015/029398 dated Jul. 30, 2015; ISR 9 pages; WO 5 pages.

Robertson, S.H., "A Study of Helicopter Crash-Resistant Fuel Systems", U.S. Department of Transportation Federal Aviation Administration, DOT/FAA/AR-01/76, Office of Aviation Research, Washington, D.C., Feb. 2002.

Snap-Tite, "Quick Disconnect Couplings & Hydraulic Valves", downloaded from http://www.snap-titequickdisconnects.com/qd_pdf/qdvccENG.pdf on Nov. 25, 2013.

Squibb Taylor, "LP-Gas Equipment", Catalog LP-07, downloaded from http://www.squibbtaylor.com/lp_07catalog.pdf on Nov. 25, 2013.

Extended European Search Report; European Application No. 15789860.2; dated Dec. 5, 2017; 8 Pages.

* cited by examiner

FUEL SYSTEM BREAKAWAY VALVE REACTION BRIDGE AND REACTION COLLAR

CROSS REFERENCE TO RELATED APPLICATIONS

This application is a National Phase Application of Patent Application PCT/US2015/029398 filed on May 6, 2015, which claims benefit of U.S. Provisional Application No. 61/990,747 filed May 9, 2014, the contents of which are incorporated herein by reference in their entirety.

BACKGROUND OF THE INVENTION

The subject matter disclosed herein relates to aircraft. More specifically, the subject disclosure relates to fuel bladder structures for aircraft.

Aircraft, such as airplanes, helicopters, turbo props and tilt rotor aircraft typically often include one or more flexible containers, or bladders, for storage of fuel on board the aircraft. The bladder provides a sealed volume for the storage of fuel as an alternative to forming a sealed chamber in the aircraft structure. Mounting the bladder in such a chamber is typically difficult and costly. The bladders include fittings and/or connections for filling the bladder with fuel, outputting the fuel to an aircraft engine, and may also include ancillary components such as fuel pumps and fuel filters and vent fittings.

In a typical aircraft, most often a helicopter, the bladders are contained in sponsons, or projections from the fuselage of the aircraft. As such, the fuel bladders are contained in a space external to the fuselage and do not negatively impact cargo or passenger space in the aircraft. Further, the external location allows for easy access for installation and mounting of the fuel bladders into the sponsons.

The fuel bladder further must include crashworthiness features to prevent leakage of the fuel bladder in the case of fuel cell tear away, hose/device pull out, structure separation or other occurrence preventing fuel from spilling into the cockpit and/or passenger compartment. Embedding the fuel bladder into the fuselage presents unique challenges to fulfilling this requirement.

BRIEF DESCRIPTION OF THE INVENTION

In one embodiment, a flexible fuel bladder assembly for an aircraft includes a flexible fuel bladder positioned at an airframe and having an opening to allow a flow of fuel into and/or out of the fuel bladder. A breakaway valve is operably connected to the fuel bladder at the opening to control a flow of fuel therethrough. A non-contacting or loose reaction feature is affixed to the airframe and is interactive with the breakaway valve such that movement of the breakaway valve relative to the reaction feature results in breakage of a valve body of the breakaway valve and closure of the breakaway valve to prevent flow of fuel therethrough.

Additionally or alternatively, in this or other embodiments the reaction feature of the airframe interacts with a reaction flange of the breakaway valve to break the valve body.

Additionally or alternatively, in this or other embodiments the reaction feature is a bridge spanning the opening. The reaction bridge includes a bridge opening through which the breakaway valve at least partially extends.

Additionally or alternatively, in this or other embodiments a first reaction flange is located at a first surface of the reaction bridge and a second reaction flange is located at a second surface of the reaction bridge opposite the first surface.

Additionally or alternatively, in this or other embodiments the reaction feature is a reaction collar affixed to the airframe at the opening.

Additionally or alternatively, in this or other embodiments a reaction flange has a flange outer diameter greater than a collar outer diameter.

Additionally or alternatively, in this or other embodiments a cup is affixed to the fuel bladder and secured to the airframe at a first airframe surface. The reaction collar is secured to the airframe at a second airframe surface opposite the first airframe surface. The valve body is secured to the cup.

In another embodiment, an aircraft includes an airframe and an engine located at the airframe. A flexible fuel bladder is located at the airframe and is in flow communication with the engine, having an opening to allow a flow of fuel into and/or out of the flexible fuel bladder. A fuel line is located at the opening. A breakaway valve operably connects the fuel bladder to the fuel line at the opening to control a flow of fuel therethrough. A non-contacting or loose fitting reaction feature is affixed to the airframe and is interactive with the breakaway valve such that movement of the breakaway valve relative to the reaction feature results in breakage of a valve body of the breakaway valve and closure of the breakaway valve to prevent flow of fuel therethrough as well as to also allow the fuel line to act directly on the breakaway valve if it should be pulled upon.

Additionally or alternatively, in this or other embodiments the reaction feature of the airframe interacts with a reaction flange of the breakaway valve to break the valve body.

Additionally or alternatively, in this or other embodiments the reaction feature is a bridge spanning the opening. The reaction bridge includes a non-contacting or loose fitting bridge opening through which the breakaway valve at least partially extends.

Additionally or alternatively, in this or other embodiments a first reaction flange is located at a first surface of the reaction bridge and a second reaction flange is located at a second surface of the reaction bridge opposite the first surface.

Additionally or alternatively, in this or other embodiments the reaction feature is a reaction collar affixed to the airframe at the opening.

Additionally or alternatively, in this or other embodiments a reaction flange has a flange outer diameter greater than a collar outer diameter.

Additionally or alternatively, in this or other embodiments a cup is affixed to the fuel bladder and secured to the airframe at a first airframe surface. The reaction collar is secured to the airframe at a second airframe surface opposite the first airframe surface. The valve body is secured to the cup.

Additionally or alternatively, in this or other embodiments the opening is one of a fuel fill opening or a fuel feed opening.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
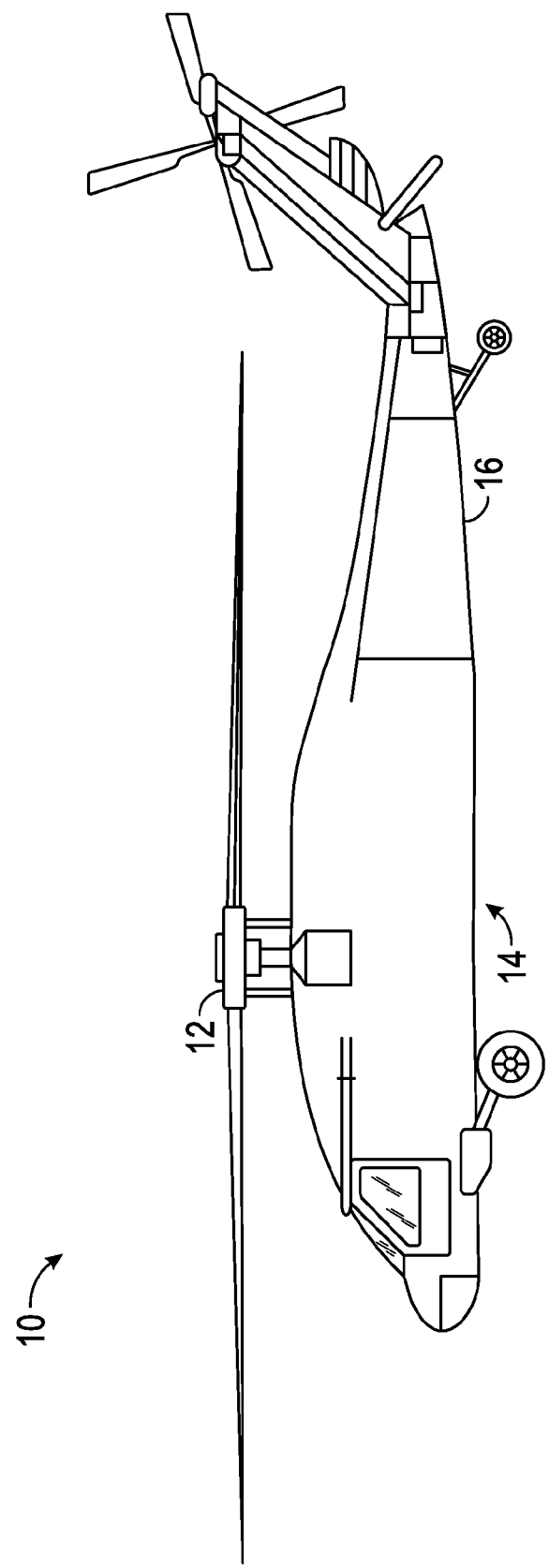
FIG. 1 is a schematic view of an embodiment of a helicopter.

Shown in FIG. 1 is a schematic of a rotary wing aircraft, in this embodiment, a helicopter 10. The helicopter 10 includes a main rotor assembly 12, and a fuselage 14 having an extending tail 16.

Figure 2:
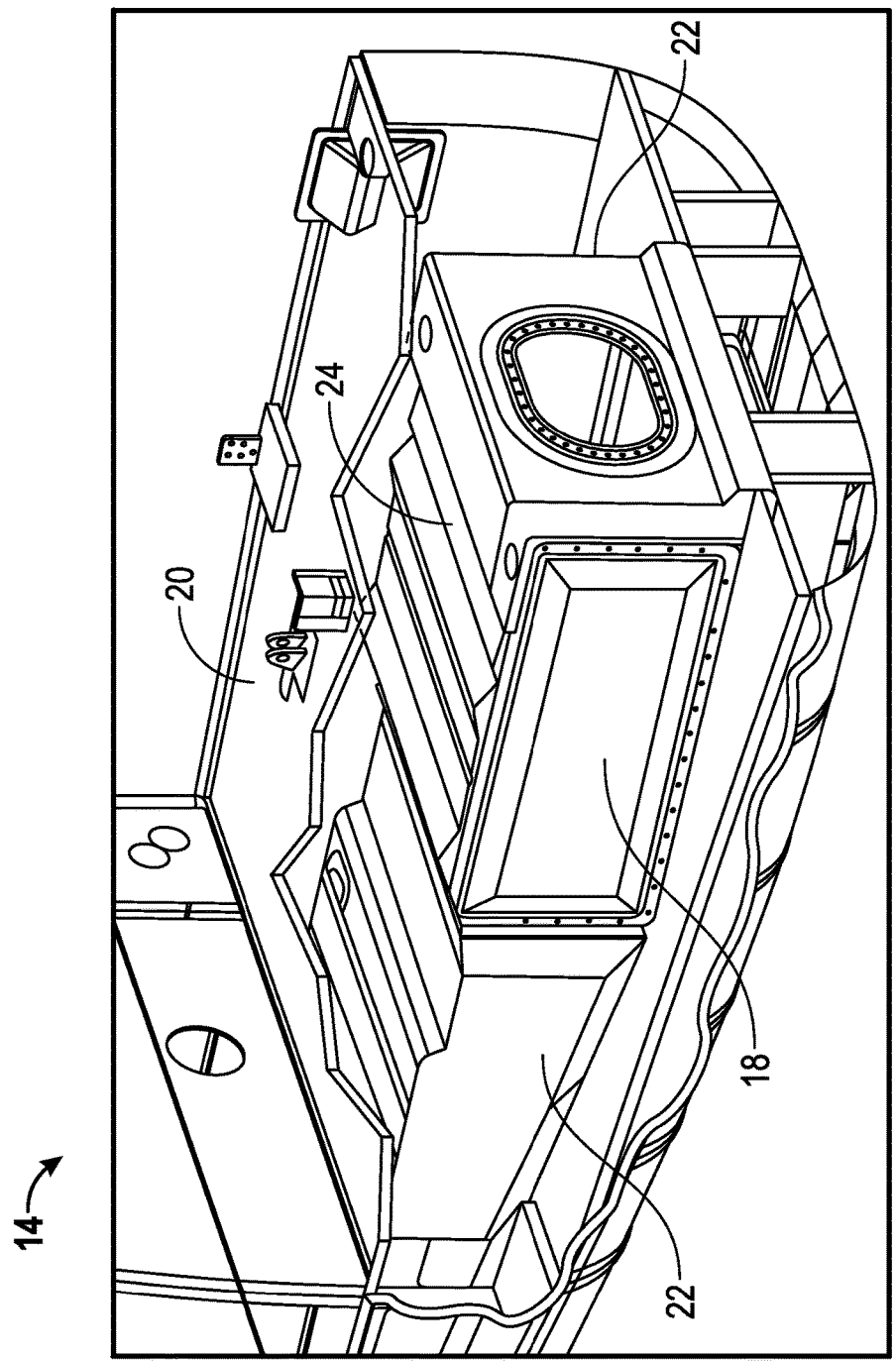
FIG. 2 is a perspective view of an embodiment of a flexible fuel bladder installed within the structure of an aircraft.
Figure 3:
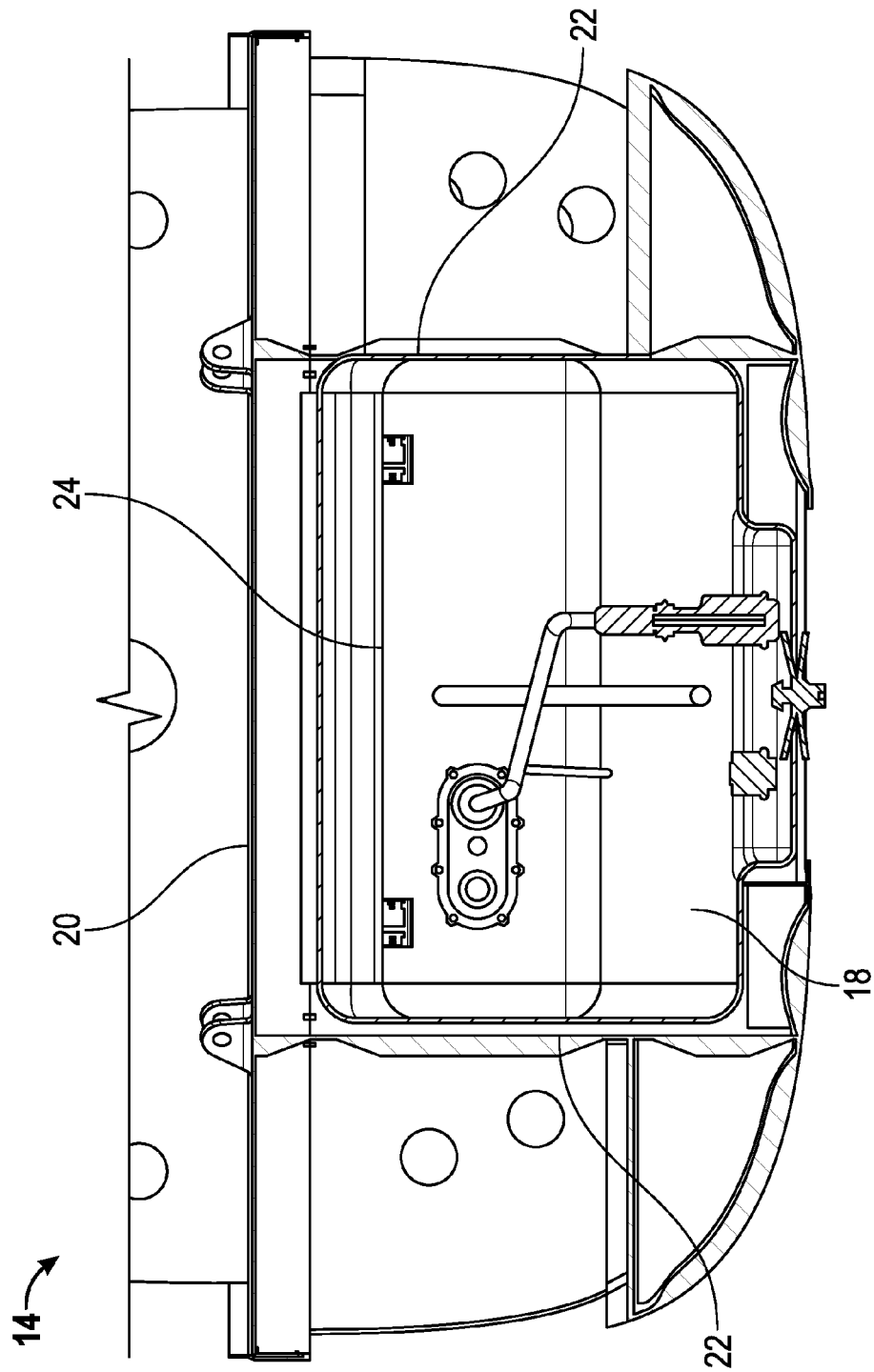
FIG. 3 is a cross sectional view of an embodiment of a flexible fuel bladder installed in an aircraft.

Referring to FIGS. 2 and 3, a flexible fuel bladder 18 is located in the fuselage 14. The bladder 18 is positioned in the fuselage 14 below a deck, for example, a transmission deck 20 and between two keels 22, which in some embodiments extend substantially perpendicular to the transmission deck 20. The bladder 18 includes a top portion 24 closest to the transmission deck 20.

Figure 4:
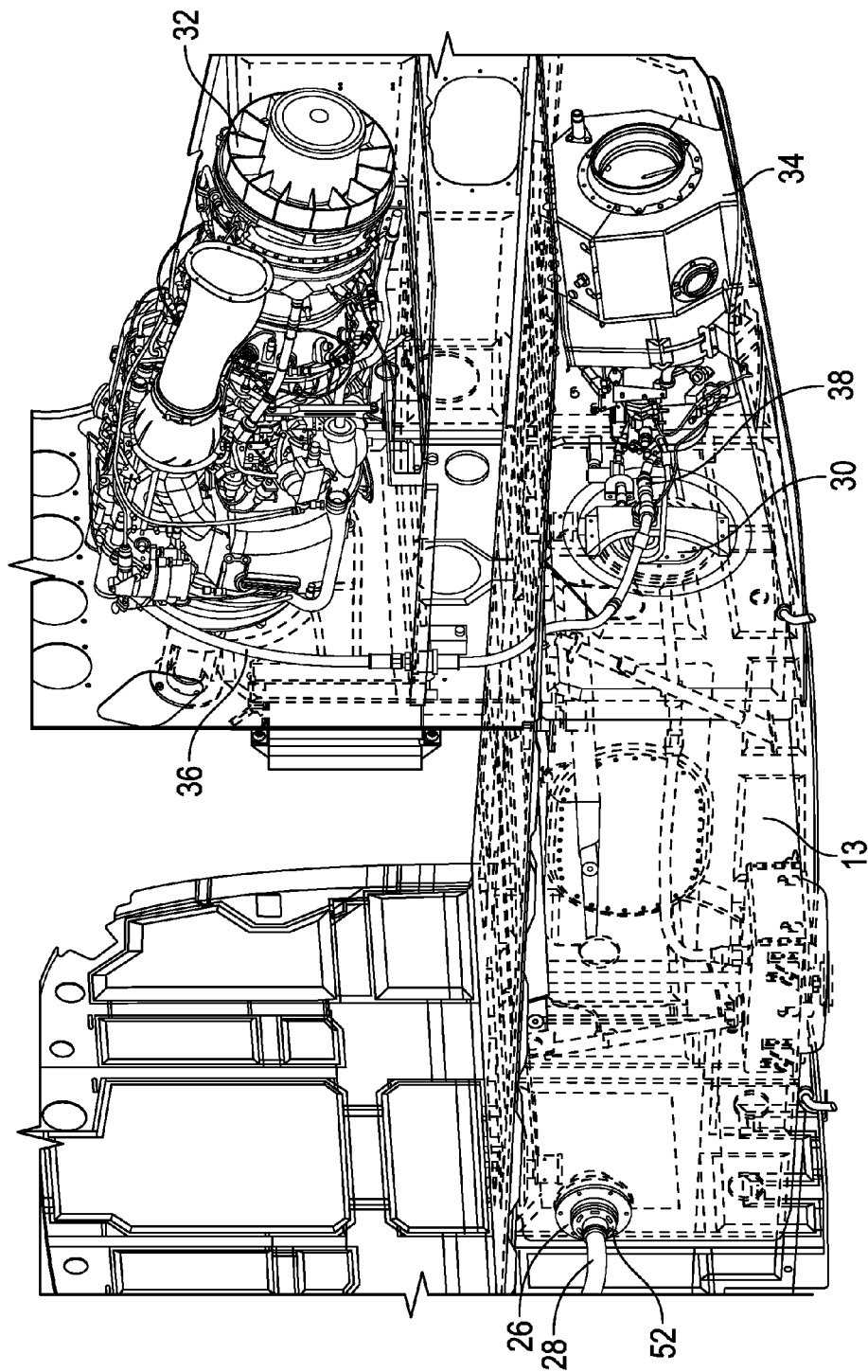
FIG. 4 is a perspective view of an embodiment of a flexible fuel bladder installed in an aircraft.

Referring to FIG. 4, the bladder 18 includes a fuel fill opening 26 for a gravity-driven fuel fill line 28 and further includes a fuel feed opening 30 through which fuel is directed to an engine 32 and an auxiliary power unit 34 via fuel feed lines 36 and 38.

Figure 5:
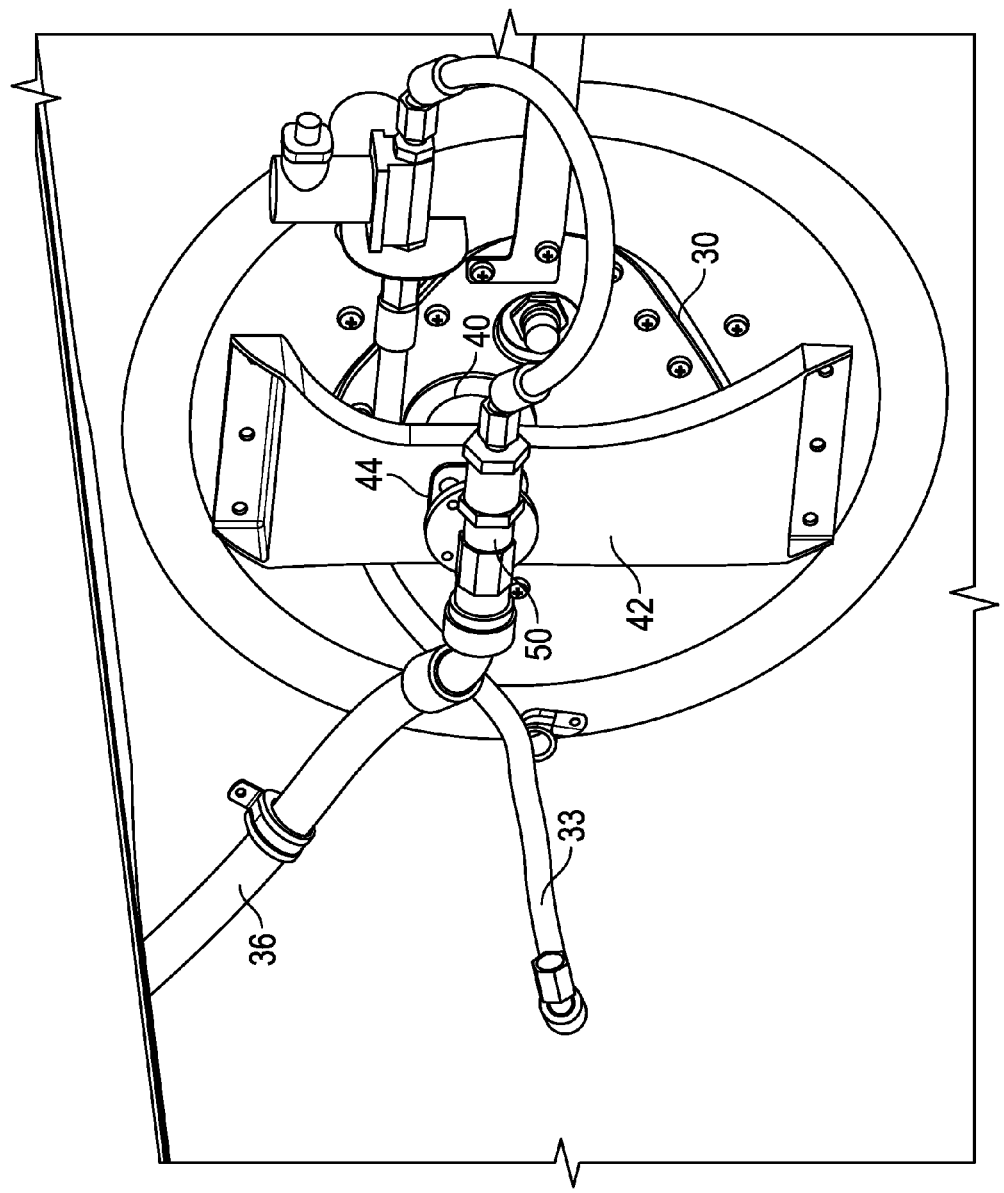
FIG. 5 is a view of an embodiment of a fuel feed valve for a fuel bladder.
Figure 6:
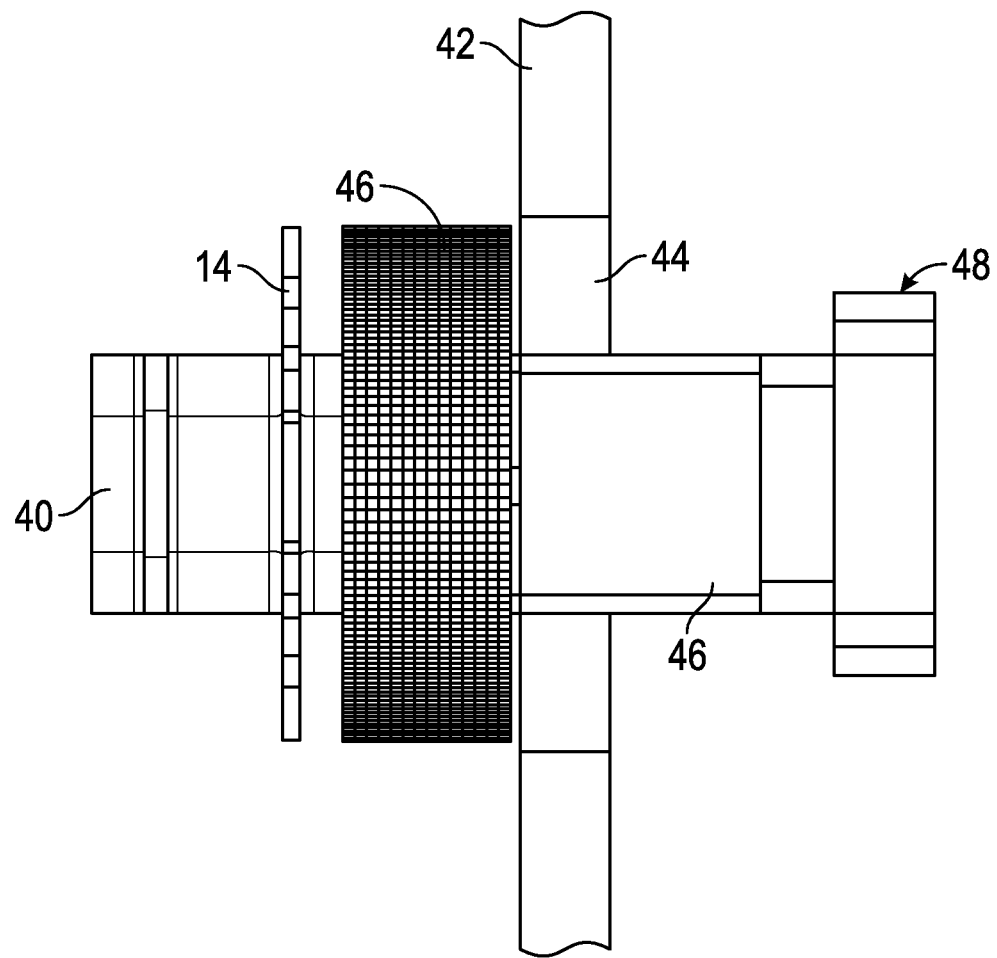
FIG. 6 is a cross-sectional view of an embodiment of a fuel feed valve for a fuel bladder.

Referring now to FIG. 5, a fuel feed breakaway valve (FFBV) 40 is disposed at the fuel feed opening 30. The FFBV 40 is configured to close should it become forcibly disconnected from the fuel feed lines 36, 38 thereby preventing fuel leakage from the bladder 18 into the helicopter 10. A reaction bridge 42 is secured to the fuselage 14 and spans the fuel feed opening 30. The reaction bridge 42 includes a bridge opening 44 into which a throat portion 46, referring now to FIG. 6, of the FFBV 40 is inserted. In some embodiments, the bridge opening 44 is rectangular or square and is sized loosely to allow for rotation and other movement of the FFBV 40 relative to the reaction bridge 42. The FFBV 40 includes features to limit the amount of movement of the FFBV 40, and to prevent the FFBV 40 from being pulled or pushed entirely through the bridge opening 44. For example, the FFBV 40 includes a mount flange 46 between the reaction bridge 42 and the fuel feed opening 30, and an end flange 48 at an opposing side of the bridge opening 44 from the mount flange 46. Both the end flange 48 and the mount flange 46 are sized such that the end flange 48 and the mount flange 46 cannot pass through the bridge opening 44. The end flange 48 connects the FFBV 40 to, for example a T-fitting 50 which, in turn is connected to fuel feed lines 36 and 38 to distribute fuel to the engine 32 and the auxiliary power unit 34. With the FFBV 40 captured by the reaction bridge 42, substantial movement of the fuel bladder 18 and/or the fuel lines 36 and 38, such as in a crash event, will cause sufficient stresses on the FFBV 40 to break the FFBV 40, resulting in its closure. The closure prevents fuel from leaking from the fuel bladder 18 via the fuel feed opening 30.

Figure 7:
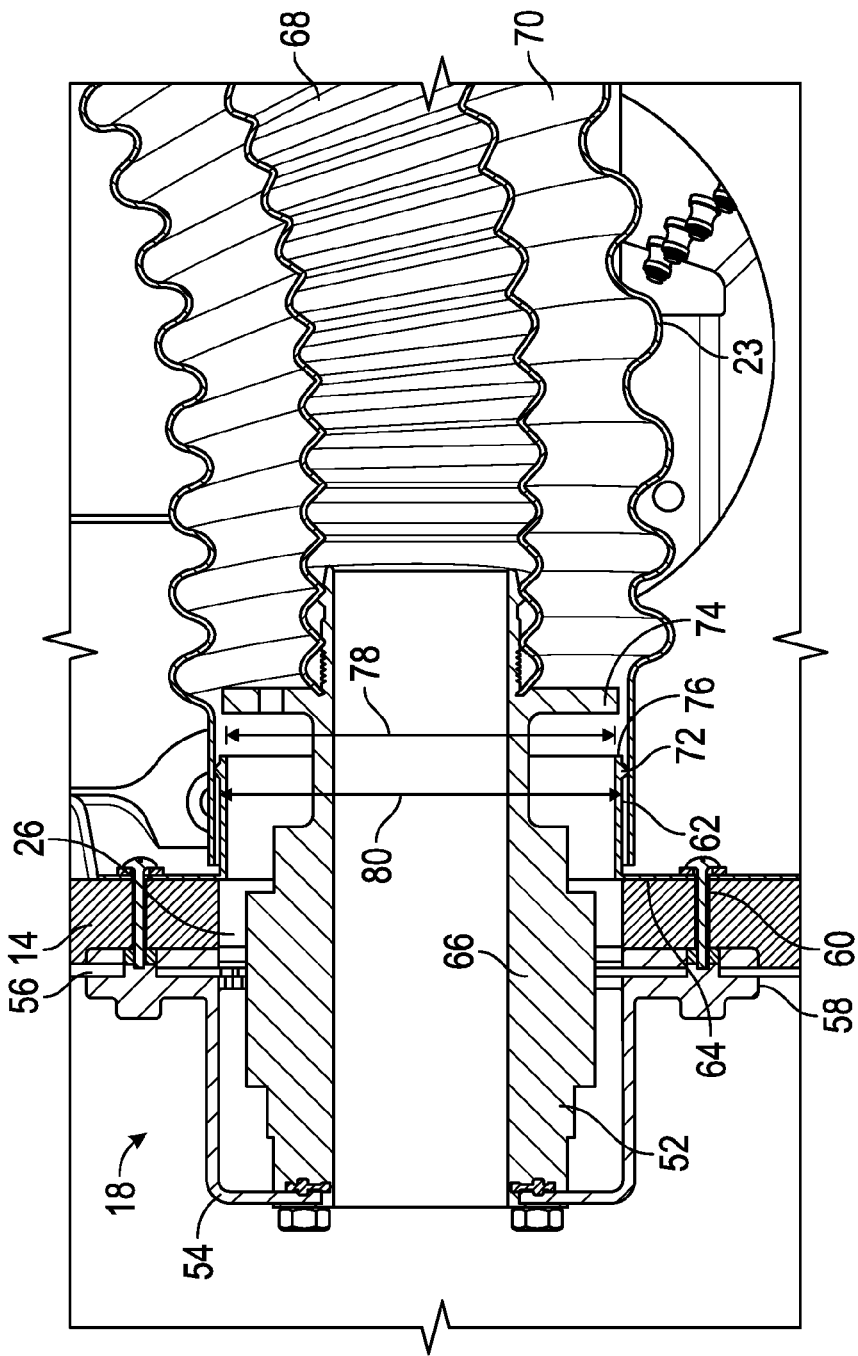
FIG. 7 is a cross-sectional view of an embodiment of a fuel filler valve for a fuel bladder.

Referring again to FIG. 4, the bladder 18 is filled via the gravity-driven fuel fill line 28 secured at the fuel fill opening 26, and includes a gravity fill breakaway valve (GFBV) 52 connecting the fuel fill line 28 to the bladder 18, as shown in more detail in FIG. 7. The GFBV 52 is affixed to the bladder 18 via a cup 54 connected to the bladder 18, with the cup 54 affixed to a bladder wall 56 and to a first fuselage surface 58 at the fuel fill opening 26 via one or more fasteners 60, or other attachment means. A reaction collar 62 is affixed to a second fuselage surface 64 opposite the first fuselage surface 58 at the fuel fill opening 26. The GFBV 52 includes a valve body 66 extending from the cup 54, through the fuel fill opening 26, through the reaction collar 62 and further into a fuel passage fill line 68 located within a fuel vapor barrier hose 28. In some embodiments, the valve body 66 is coaxial with the reaction collar 62 and the fuel fill line 68. The vapor barrier hose 28 further includes a vapor passage 70 radially outboard of the fuel passage fill line 68 which fits over the reaction collar 62. In some embodiments, the vapor passage 70 seals to the reaction collar 62 via a rib 72 disposed at the reaction collar 62, or alternatively at the cuff portion of the vapor barrier hose 28.

The valve body 66 includes a reaction flange 74 extending radially outwardly from the valve body 66 and located axially beyond a collar end 76 such that the collar end 76 is located axially between the reaction flange 74 and cup 54. The reaction flange 74 has a flange outer diameter 78 greater than a collar outer diameter 80 of the collar end 76. The reaction collar 62 and the reaction flange 74 are configured and aligned such that when the fuel bladder 18 moves relative to the fuselage 14, the valve body 66 moves with the bladder 18. In doing so, the reaction flange 74 impacts the collar end 76, and results in breakage of the valve body 66. Breakage of the valve body 66 results in closure of the GFBV 52, preventing fuel leakage from the bladder 18 via the fuel fill opening 26.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A flexible fuel bladder assembly for an aircraft comprising:
   a flexible fuel bladder disposed at an airframe and having an opening to allow a flow of fuel into and/or out of the fuel bladder;
   a breakaway valve operably connected to the fuel bladder at the opening to control a flow of fuel therethrough; and
   a non-contacting or loose reaction feature affixed to the airframe and interactive with the breakaway valve such that movement of the breakaway valve relative to the reaction feature results in breakage of a valve body of the breakaway valve and closure of the breakaway valve to prevent flow of fuel therethrough, wherein the reaction feature of the airframe interacts with a reaction flange of the breakaway valve to break the valve body.

2. The flexible fuel bladder assembly of claim 1, wherein the reaction feature is a bridge spanning the opening, the bridge including a bridge opening through which the breakaway valve at least partially extends.

3. The flexible fuel bladder assembly of claim 2, further comprising a first reaction flange disposed at a first surface of the reaction bridge and a second reaction flange disposed at a second surface of the reaction bridge opposite the first surface.

4. The flexible fuel bladder assembly of claim 1, wherein the reaction feature is a reaction collar affixed to the airframe at the opening.

5. The flexible fuel bladder of claim 4, wherein a reaction flange has a flange outer diameter greater than a collar outer diameter.

6. The flexible fuel bladder of claim 4, further comprising a cup affixed to the fuel bladder and secured to the airframe at a first airframe surface, the reaction collar secured to the airframe at a second airframe surface opposite the first airframe surface, the valve body secured to the cup.

7. An aircraft comprising:
an airframe;
an engine disposed at the airframe;
a flexible fuel bladder disposed at the airframe and in flow communication with the engine, having an opening to allow a flow of fuel into and/or out of the flexible fuel bladder; and
a fuel line disposed at the opening;
a breakaway valve operably connecting the fuel bladder to the fuel line at the opening to control a flow of fuel therethrough; and
a non-contacting or loose fitting reaction feature affixed to the airframe and interactive with the breakaway valve such that movement of the breakaway valve relative to the reaction feature results in breakage of a valve body of the breakaway valve and closure of the breakaway valve to prevent flow of fuel therethrough as well as to also allow the fuel line to act directly on the breakaway valve if it should be pulled upon, wherein the reaction feature of the airframe interacts with a reaction flange of the breakaway valve to break the valve body.

8. The aircraft of claim 7, wherein the opening is one of a fuel fill opening or a fuel feed opening.

9. The aircraft of claim 7, wherein the reaction feature is a bridge spanning the opening, the bridge including a non-contacting or loose fitting bridge opening through which the breakaway valve at least partially extends.

10. The aircraft of claim 9, further comprising a first reaction flange disposed at a first surface of the reaction bridge and a second reaction flange disposed at a second surface of the reaction bridge opposite the first surface.

11. The aircraft of claim 7, wherein the reaction feature is a reaction collar affixed to the airframe at the opening.

12. The aircraft of claim 11, wherein a reaction flange has a flange outer diameter greater than a collar outer diameter.

13. The aircraft of claim 11, further comprising a cup affixed to the fuel bladder and secured to the airframe at a first airframe surface, the reaction collar secured to the airframe at a second airframe surface opposite the first airframe surface, the valve body secured to the cup.

\* \* \* \* \*